United States Patent
Kooij

(10) Patent No.: US 7,591,874 B2
(45) Date of Patent: Sep. 22, 2009

(54) METHOD AND APPARATUS FOR REDUCING METAL-OXYGEN COMPOUNDS

(75) Inventor: Christiaan Johannes Kooij, Alkmaar (NL)

(73) Assignee: Corus Technology BV, Ijmuiden (NL)

( * ) Notice: Subject to any disclaimer, the term of this patent is extended or adjusted under 35 U.S.C. 154(b) by 126 days.

(21) Appl. No.: 10/574,466

(22) PCT Filed: Oct. 1, 2004

(86) PCT No.: PCT/EP2004/011345

§ 371 (c)(1),
(2), (4) Date: Feb. 12, 2007

(87) PCT Pub. No.: WO2005/033347

PCT Pub. Date: Apr. 14, 2005

(65) Prior Publication Data

US 2007/0209479 A1    Sep. 13, 2007

(30) Foreign Application Priority Data

Oct. 3, 2003   (EP) ................... 03078074
Feb. 23, 2004  (EP) ................... 04075552

(51) Int. Cl.
    *C22B 5/20* (2006.01)
(52) U.S. Cl. ....................................... 75/413
(58) Field of Classification Search ............ 75/413
    See application file for complete search history.

(56) References Cited

U.S. PATENT DOCUMENTS 2,780,537 A    2/1957 Stelling et al.
(Continued)

FOREIGN PATENT DOCUMENTS

CA    2388847    5/2000
(Continued)

OTHER PUBLICATIONS

S. Prakash, Reduction and Sintering of Fluxed Iron Ore Pellets-A Comprehensive Review, The Journal of The South African Institute of Mining and Metallurgy, Jan./Feb. 1996, pp. 3-16.*

(Continued)

*Primary Examiner*—Roy King
*Assistant Examiner*—Yoshitoshi Takeuchi
(74) *Attorney, Agent, or Firm*—Novak Druce + Quigg LLP

(57) ABSTRACT

Disclosed is a method of reducing a metal-oxygen compound wherein carbon acts as a reducing agent. The method includes in a first reaction stage, passing CO gas into a reaction chamber containing the metal-oxygen compound, under conditions such that CO is converted to solid carbon and carbon dioxide thereby introducing the solid carbon so formed to said metal-oxygen compound, and in a second reaction stage, causing the carbon, introduced to the metal-oxygen compound in the first reaction stage, to reduce the metal-oxygen compound. There is present, at least in the second reaction stage, a first promoter material effective to promote the reduction of the metal-oxygen compound. The first promoter material includes a first promoter metal and/or a compound of a first promoter metal. Also disclosed is an apparatus for carrying out the reduction of a metal-oxygen compound wherein carbon acts as a reducing agent.

21 Claims, 2 Drawing Sheets

U.S. PATENT DOCUMENTS

| | | | |
|---|---|---|---|
| 2,979,396 A | 4/1961 | Langenberg | |
| 3,637,368 A | 1/1972 | Bessant | |
| 3,788,835 A | 1/1974 | Lewis et al. | |
| 3,979,206 A | 9/1976 | Middelhoek et al. | |
| 4,053,301 A * | 10/1977 | Stephens, Jr. | 75/10.38 |
| 4,396,423 A | 8/1983 | Stephens, Jr. et al. | |
| 5,858,057 A * | 1/1999 | Celada-Gonzalez et al. | 75/490 |

FOREIGN PATENT DOCUMENTS

| | | |
|---|---|---|
| EP | 0617136 | 9/1994 |
| GB | 1471544 | 4/1977 |
| WO | 0131069 | 5/2001 |

OTHER PUBLICATIONS

Li et al. "Effects of Zn, Cu, and K promoters on the structure and on the reduction, carburization, and catalytic behavior of iron-based Fischer-Tropsch synthesis catalysts" *Catalysis Letters*, vol. 77, No.4, 2001, pp. 197-205.

* cited by examiner

US 7,591,874 B2

METHOD AND APPARATUS FOR REDUCING METAL-OXYGEN COMPOUNDS

This application is a §371 National Stage Application of International Application No. PCT/EP2004/011345, filed on 1 Oct. 2004, claiming the priority of European Patent Application No. 03078074.6 filed on 3 Oct. 2003 and European Patent Application No. 04075552.2 filed 23 Feb. 2004.

FIELD OF THE INVENTION

The present invention relates to a method for reducing metal-oxygen compounds with carbon as an agent for reducing the metal-oxygen compounds. The invention also relates to an apparatus for reducing metal-oxygen compounds with carbon as an agent for reducing the metal-oxygen compounds.

BACKGROUND OF THE INVENTION

Reduction of metal-oxygen compounds, such as metal-oxides, for instance iron oxides, has been performed in large-scale reduction furnaces. For the reduction of iron-oxygen compounds, the blast furnace has been the workhorse for the production of pig iron from iron ore for over a century. The primary reductant and source of chemical energy in these blast furnaces is coke. Coke is produced by baking coal in the absence of oxygen in order to remove the volatile hydrocarbons and to give the coke the critical properties for stable blast furnace operation.

Coke making is problematic from an environmental perspective as many of the volatile hydrocarbons are hazardous. Also not all types of coal are suitable for coke making. Moreover, demand has decreased for the by-products of coke making.

Therefore, decreasing the coke rate and the over-all fuel rate of the blast furnace has been a major focus of recent developments. Also new technologies to circumvent the blast furnace process, such as direct reduction of iron ore, have been developed.

Direct reduction involves the production of iron by reduction of iron ore with a reducing agent, which can be a solid reducing agent or a gaseous reducing agent. The solid reducing agents may be coal of any size, instead of coke. Examples of gaseous reducing agents are natural gas and carbon monoxide. Ores for direct reduction have to meet stringent specifications with high percentage of Fe and low content of unwanted elements.

Direct reduction of iron ore may produce a solid direct-reduced iron product or, at high operating temperatures or in combination with a smelting device, a liquid product.

The product of a direct reduction process may be discharged into a second reactor for melting and optional further refining, or cooled and stored for later use.

At present, dust and sludge from an integrated steelworks is recycled as raw material in the ore preparation stage. These waste materials, often referred to as 'fines', may contain iron-containing compounds such as iron oxides. However, due to the high content of metals such as zinc in these fines, the accumulation of such elements, and the limitations of the amount of these metals for charging into a blast furnace, these waste materials have often to be recycled in an other way or disposed of, resulting in additional costs or burdening of the environment.

A known process for reduction of iron ore is based on the direct reaction of coal and lump iron ore or pellets in a rotary kiln. Another known process is based on the reduction of composite pellets containing iron oxide and carbon from for example coal, coke or charcoal in a rotary hearth furnace. The off-gases from the reduction reaction can be post-combusted in the furnace to provide a portion of the heat required for the process. Another known process involves direct reduction of fine iron ore in a fluidised bed reactor.

A major disadvantage of these known reduction processes is that they operate at high temperatures. For example, the rotary hearth process operates at temperatures of about 1250° C. If these processes are based upon the use of coal, a further disadvantage is the development of large volumes of carbon monoxide, hydrogen and complex and hazardous hydrocarbons. Condensation of these hydrocarbons must be avoided which requires removal or post-combustion of the off-gases while re-oxidation of the metal must be prevented. Also, because of the high operating temperatures and consequent heat losses, and the generation of large amounts of carbon monoxide, the energy efficiency of the direct reduction processes is generally poor resulting in a high carbon consumption rate. The high operating temperatures also result in the formation of significant amounts of harmful nitrogen-oxygen compounds (NOx-gases). Furthermore, direct reduction technologies based on the use of coal have to deal with higher levels of sulphur because of the presence of sulphur in the coal.

GB-A-1471544 describes a process of direct reduction of iron ore, in which iron oxide, such as magnetite, is mixed with a nucleating agent in the form of ferric chloride and coal is mixed with an activator also in the form of ferric chloride. These two mixtures are thoroughly mixed together and formed into balls. The balls are purged with cold nitrogen, then heated slowly by heated nitrogen to 1050° C., held for 30 minutes then cooled in cold nitrogen. $CO_2$ is formed initially from the reaction of carbon with the oxide. The activating agent promotes the reduction of the $CO_2$ by the carbon to form CO. The nucleating agent (iron from the ferric chloride, aids adsorption of CO at the oxide surface to accelerate the reduction of the oxide by the CO.

U.S. Pat. No. 3,979,206 describes reduction of MgO with carbon at 1000-2000° C. in the presence of iron, cobalt, nickel, chromium or manganese. Fe powder, MgO powder and C powder were heated in a vacuum furnace. Mg vapour is recovered. The Fe is said to act as a catalyst, permitting lowering of the reaction temperature.

SUMMARY OF THE INVENTION

It is an object of the invention to provide a method and an apparatus for reducing metal-oxygen compounds which can operate at relatively low temperatures.

It is a further object of this invention to provide a method and an apparatus for reducing metal-oxygen compounds which can produce lower volumes of hazardous off-gases such as for example hydrocarbons and/or NOx-gases.

It is also an object of the invention to provide a method and an apparatus for reducing metal-oxygen compounds, which can result in an increased carbon efficiency per unit of weight of reduced metal.

It is also an object of the invention to provide a method and an apparatus for reducing metal-oxygen compounds, which can have an improved energy efficiency and provide a product with a low sulphur content.

It is a further object of the invention to provide a method and an apparatus which may be used for reducing a mixture of different metal-oxygen compounds, which results in a metal alloy.

To achieve one or more of these objects there is provided a method of reducing a metal-oxygen compound wherein carbon acts as a reducing agent, comprising:

in a first reaction stage, passing CO gas into a reaction chamber containing the metal-oxygen compound, under conditions such that CO is converted to solid carbon and carbon dioxide thereby introducing the solid carbon so formed to the metal-oxygen compound, and in a second reaction stage, causing the carbon, which is introduced to the metal-oxygen compound in the first reaction stage, to reduce the metal-oxygen compound, wherein there is present, at least in the second reaction stage, a first promoter material effective to promote the reduction of the metal-oxygen compound, the first promoter material comprising a first promoter metal and/or a compound of a first promoter metal.

One feature of the invention is the use of the first promoter material, in the second reaction stage. It was surprisingly found that an addition of a first promoter material, greatly enhances the reduction rate of the metal-oxygen in which carbon is used as a reducing agent for reducing the metal-oxygen compound. It was also found that this reduction takes place at significantly lower temperatures in comparison to the known types of direct reduction processes. For example, the known types for reduction of iron-oxygen compounds employ operating temperatures of over 950° C. The lower operating temperature of the process achievable in the invention will also result in lower output of harmful nitrogen-oxygen compounds as well as in a reduced heat loss of the installations.

It is remarked that in known reduction processes, like the reduction process of iron-oxygen compounds in an iron-producing blast furnace, the metal formed in the reduction process does not aid the reduction reaction because it does not act as a catalyst. This is believed to be caused by the fact that in such known processes and in such a blast furnace, the process conditions for the catalytic effect of the formed metal on the reduction reaction for reducing the iron-oxygen compounds are not fulfilled.

In an embodiment of the invention, at least part of the first promoter material metal formed from an intermediate compound (the first promoter material) taken from the group of compounds consisting of metal carbides, metal hydrides and metal nitrides wherein the metal in the compound is the first promoter metal, and wherein the compound optionally comprises oxygen. This intermediate compound may be added to the metal-oxygen compound. The intermediate compound such as a metal carbide enables forming of the first metal thereby aiding the reduction reaction of the metal-oxygen compounds. Other intermediate compounds are for example metal hydrides, metal nitrides or mixtures of metal carbides and/or metal hydrides and/or metal nitrides. Another example of an intermediate compound is metal carbonyl, which may dissociate into a metal and carbon monoxide. Metal carbonyl is quite expensive, and is not normally used in a bulk metal production process.

The advantage of using an intermediate compound is that the first promoter metal which is formed upon decomposition of the intermediate compound, is finely distributed thereby enabling it to aid the reduction reaction effectively. The first metal may be formed from the intermediate compound (immediately) prior to the reduction reaction for reducing the metal-oxygen compound. If the intermediate compound is a metal carbide wherein the metal is the first promoter metal, the first promoter metal and the carbon both become finely distributed upon decomposition of the intermediate compound, thereby enabling the first promoter metal to aid the reduction reaction effectively and the carbon to act as a reducing agent in the reduction reaction effectively.

The first promoter metal for the reduction reaction of the metal-oxygen compound can be added to the metal-oxygen compound at any stage of the process provided the first metal is at least present at the time the reduction of the metal-oxygen compounds should occur.

A second feature of the invention is that carbon monoxide is brought into contact with the metal-oxygen compounds and the carbon and carbon dioxide are formed by the Boudouard reaction from the carbon monoxide, preferably with the aid of a second promoter material which may for example be a second promoter metal. The carbon is referred to as Boudouard-carbon and typically has the crystalline structure of graphite. The carbon monoxide may be substantially pure carbon monoxide, but it may also be part of a gaseous mixture comprising carbon monoxide. During start-up of the process of reducing the metal-oxygen compound, but also during the process of reducing the metal-oxygen compound, compounds similar to Boudouard-carbon and in a suitable form, such as graphite powder, may be added to the metal-oxygen compounds to serve as the reducing agent for at least part of the reduction of the metal-oxygen compounds.

Thus the carbon, which is used as a reducing agent for reducing the metal-oxygen compound, is amorphous carbon and/or crystalline carbon, preferably graphite, because the reaction rate of the reduction reaction is considerably increased. Crystalline carbon, or graphite in particular, is a preferred form of carbon. In the invention, carbon is in the form of powder which achieves the effect of increasing the number of contact points between reactants thereby also enhancing the reduction reaction rate.

The Boudouard-carbon is generated in the first reaction stage by dissociation of carbon-monoxide by the Boudouard reaction:

$$2CO \leftrightarrow C + CO_2 \tag{1}$$

In the first reaction stage, the conditions are such that this equilibrium is shifted to the right side of the reaction (1) so that the carbon is formed. The expert can easily select the appropriate conditions.

Surprisingly, it was found that this Boudouard carbon, which has a graphite structure, is a reducing agent which, in combination with the first promoter material, e.g. the first promoter metal, very effectively reduces the metal-oxygen compounds when the Boudouard-carbon, the first promoter metal and the metal-oxygen compound are brought into contact.

As mentioned, preferably, at least in the first reaction stage, a second promoter material is present, the second promoter material comprising a second promoter metal and/or a compound of a second promoter metal which promotes the conversion of CO to carbon and carbon dioxide. Preferably the second promoter material is the second promoter metal, or a second promoter metal carbide, a second promoter metal hydride or a second promoter metal nitride, or a combination thereof. Preferably the second promoter material is in powder form.

Generally, in the invention the first and second promoter materials, in particular the first and second promoter metals, have the function of causing the respective reactions of the two reaction stages to take place more quickly, more completely or at lower temperature (or combinations of these, either by catalysis or by another reaction mechanism.

Surprisingly it was also found that the first promoter material, e.g. the first promoter metal, not only aids the reduction of the metal-oxygen compounds, but it may also have a beneficial effect on the formation of the Boudouard-carbon by the Boudouard reaction. The first promoter metal may be added to the process but some of it may also be formed by the reduction of the metal-oxygen compounds already occurring at the lower temperature at which the Boudouard reaction is performed.

In an embodiment of the invention, in the reduction reaction for reducing the metal-oxygen compounds the oxygen of the metal-oxygen compounds is mainly bound to the carbon which is formed from the carbon monoxide by the Boudouard reaction. When using carbon as the primary reducing agent, the process can be operated at low temperatures. This is the case when coal is used as the primary source of carbon. If however natural gas is chosen as the primary source of carbon, the amount of hydrogen which is generated from the cracking of the natural gas (usually comprising large amounts of hydrocarbons such as methane) would adversely affect the operating conditions thereby reducing the advantages, particularly the efficient use of fossil fuel and the relatively low operating temperatures, to be obtained by the method according to the invention.

Small amounts of hydrogen are known to promote the formation of Boudouard-carbon and carbon dioxide from carbon monoxide by the Boudouard reaction. In case of using pure carbon monoxide, small amounts of hydrogen may be added to the carbon monoxide. Preferably, the amount of hydrogen is below 8 vol. %, more preferably below 6 vol. %. The hydrogen does not play a significant role in the reduction of the metal-oxygen compounds due to the chosen operating conditions. Reduction of metal-oxygen compounds by hydrogen takes place at significantly higher temperatures, thereby undoing the advantages of the method according to the invention.

In the invention typically more than 50%, preferably more than 70%, more preferably more than 80%, even more preferably more than 90% of the oxygen of the metal-oxygen compounds is bound to the Boudouard-carbon in the reduction reaction for reducing the metal-oxygen compounds. If the gaseous mixture comprising carbon monoxide is produced for instance by gasifying coal, the gaseous mixture may also comprise small amounts of hydrogen.

It is possible to add compounds similar to Boudouard-carbon and in a suitable form into the process, or compounds which generate Boudouard-carbon such as metal carbides, for instance during start-up. If this is the case, the Boudouard carbon in the abovementioned embodiments consists of the Boudouard carbon formed from the carbon-monoxide and/or the added carbon similar to Boudouard-carbon and in a suitable form and/or the carbon originating from the metal carbides. Since the gaseous reaction products of the process according to the invention comprise a high level of carbon-dioxide gas in comparison to the off-gases of the conventional processes, the carbon is efficiently used, thereby also reducing the amount of used fossil fuel. The amount of carbon used per unit of weight of reduced metal may consequently be lower in the process according to the invention.

Also, since Boudouard carbon from carbon monoxide instead of carbon in the form of coal is used as the reduction agent in the process, the gaseous reaction products of the process according to the invention do not contain the coal-related hazardous hydrocarbons. The sulphur content of the reacting solids is not affected if the gaseous mixture comprising the carbon monoxide does not comprise sulphur compounds. If the gaseous mixture comprising the carbon monoxide comprises hydrocarbons and/or sulphur compounds, the gaseous reaction products of the process according to the invention will contain a lower content of these hydrocarbons and/or sulphur compounds, because at least part of the heavy fraction of the hydrocarbons will have been cracked and/or used during the process. The sulphur compounds may be neutralised for instance by a known calcium treatment into calcium-sulphur compounds such as CaS which can be separated from the metallic part for instance in a cyclone.

In a further embodiment of the invention the first promoter metal is the same as the second promoter metal, thereby introducing to as low an amount as possible other metals to the products of the reduction reaction for reducing the metal-oxygen compound. In still a further embodiment of the invention the first and/or second promoter metal is the same as the metal in the metal-oxygen compounds. When producing a single metal material the amount of other elements is to be kept as low as possible to prevent contamination with other metals. When producing an alloy, it may be advantageous to use one or more metals as a first and/or second promoter metal that are different from the metal in the metal-oxygen compound.

In a preferred embodiment of the invention the reduction reaction of the metal-oxygen compounds is performed in a continuous process, the first and second reaction stages being performed simultaneously and the metal-oxygen compound being moved from a first reaction region where the first reaction stage takes place to a second reaction region where the second reaction stage takes place. Thus in a preferred embodiment the carbon monoxide moves relative to the mixture of the metal-oxygen compounds, the reducing agent for the reduction of the metal-oxygen compounds and the first and/or second promoter material metal. In a further preferred embodiment, the metal-oxygen compounds are transported in one direction and the carbon monoxide is transported in another direction. In a further preferred embodiment the metal-oxygen compounds and the carbon monoxide are transported in counter-flow. Also, at least part of the gaseous reaction products may be reintroduced into the process, thereby reducing the amount of fresh carbon monoxide that is to be added. Moreover, at least part of the substantially solid product of the reduction reaction of the metal-oxygen compounds may be reintroduced into the process as the first and/or second promoter metal for the reduction reactions, thereby reducing the amount of fresh first and/or second promoter material that is to be added.

For reasons of reaction kinetics the operating temperature in the first reaction region where the Boudouard reaction is performed is preferably below 650° C., preferably between 300 and 600° C. and more preferably between 450 and 550° C. In a preferred embodiment of the invention the metal-oxygen compounds comprise iron-oxygen compounds such as iron oxide and/or iron hydroxide and/or iron-carbonate. Also the first and/or second promoter metal may comprise iron thereby limiting the amount of non-iron metals in the resulting product of the reduction reaction of the iron-oxygen compound. For reasons of reaction kinetics the operating temperature in the reaction region where the reduction of the metal-oxygen compound, e.g. iron-oxygen compound, is performed is preferably between 550 and 900° C., preferably between 650 and 850° C., and more preferably between 700 and 775° C. The process according to the invention as described hereinabove may be performed essentially at atmospheric pressures. It is obvious for the skilled person that performing the method according to the invention at non-atmospheric pressures will shift the balance of the reactions. The invention also encompasses performing the method at sub-atmospheric or super-atmospheric pressures, and it also encompasses using the method according to the invention in such a way that the Boudouard reaction (first reaction stage)

occurs at a different pressure than the reduction of the metal-oxygen compounds (second reaction stage).

It should be noted that due to the nature of the Boudouard reaction and the reduction of the metal-oxygen compounds in terms of kinetics there may be an overlap between the reaction region where the carbon is formed from the carbon monoxide by the Boudouard reaction on the one hand and the reaction region where the reduction reaction of the metal-oxygen compounds is performed mainly occurs on the other hand, because some Boudouard carbon may still be formed in the reaction region where the reduction reaction of the metal-oxygen compounds is performed and/or because some metal-oxygen compounds may at least partly already have been reduced in the reaction region where the Boudouard reaction is performed, thereby providing at least part of a first metal for the reduction reaction.

Since the number of contact points between the reducing agent, the first promoter metal and the metal-oxygen compound determines the kinetics of the reduction process of the metal-oxygen compound by the process according to the invention, it is preferable that the metal-oxygen compound or the metal-oxygen compound and the first promoter material, e.g. first promoter metal is, in the form of a powder. The grain size of these powders should preferably be below 1 mm, but more preferably be 100 μm or lower. These powders or mixtures thereof may be pre-treated to form conglomerates such as pellets or sinter, which have a sufficient porosity for the carbon monoxide to access the metal-oxygen compound or the first metal and the metal-oxygen compound in the conglomerate. Although the process according to the invention already works when small amounts of the first promoter metal are present, it has been found that the amount of first promoter metal should preferably be higher than 1% in weight of the metal-oxygen compound, more preferably be higher than 5% in weight and preferably be about 10% in weight at the beginning of the phase in the process where the reduction of the metal-oxygen compound is performed.

The invention also relates to a method wherein the reduction reaction is performed in a shaft furnace, such as a blast furnace. The invention is also embodied in a method wherein the metal-oxygen compounds comprise iron-oxygen-compounds and wherein the reduction reaction of the iron-oxygen compounds is performed in a shaft furnace, such as a blast furnace, to produce iron. It was found that application of the process according to the invention in the conventional blast furnace process involving the addition of iron as a first promoter metal for the reduction reaction of iron ore results in a disproportionate increase of molten iron. For instance the addition of the iron as the first promoter metal, for example in the form of a powder, to iron ore to form a mixture to produce conventional pellets therefrom, may supply the mixture of iron-oxygen compounds and iron as a first promoter metal which enter the blast furnace process. During the course of the blast furnace process the pellets descend into the furnace and at the proper temperature the first generation of Boudouard carbon will start using the carbon monoxide gas which evolves from the burning coke in the lower regions of the blast furnace. The carbon monoxide gas is reduced to carbon dioxide gas and Boudouard carbon.

It should be noted that as a result of the high temperature in the conventional blast furnace process to produce pig iron from iron-oxides, the Boudouard-equilibrium (equation (1)) is shifted to the side where carbon-monoxide is formed from carbon and carbon-dioxide which was formed from cokes and oxygen that is blown in at the bottom of the blast furnace. No Boudouard-carbon is therefore formed in the conventional blast furnace process at the location in the blast furnace where the reduction of the iron-oxygen compounds is taking place.

In the process according to the invention the Boudouard carbon is believed to precipitate on the mixture of iron-oxygen compound and iron as first promoter metal and the combined materials descend further into the blast furnace. At the proper temperature the reduction of the iron-oxygen compounds will start, thereby reducing the iron-oxygen compound to iron. Ultimately, after descending even further into the blast furnace, the iron will melt and be ready for tapping from the blast furnace by known methods. It is obvious that the method according to the invention also works when the iron ore and the first promoter metal, which may be iron, are added to the process in the form of a sintered product or any other conglomerate with a large contact area between the iron ore, the first metal, and the carbon monoxide. As a result of the invention, the carbon-monoxide output of the blast-furnace process will be reduced due to the more efficient use of the carbon from the coke, and the output of molten iron from the blast furnace per time unit will increase disproportionally with regard to the added iron catalyst. In other words, the amount of molten iron per time unit than can be tapped from the furnace after the addition of x % of iron as a first promoter metal per time unit to the iron ore will result in more than 100+x % of molten iron per time unit which can be tapped, thereby making a more efficient use of the blast furnace by increasing the amount of newly formed iron from the iron-ore per time unit. Obviously, the usage of iron-ore per time unit has to be increased correspondingly.

Comparable application of the method and comparable increases in productivity may be achieved in any conventional direct reduction facility where metal ore, which may for example be sintered or be in the form of pellets, is processed. These facilities conventionally comprise at least one furnace where the reduction of the metal-oxygen compounds takes place wherein the furnace are for instance chosen from the group of furnaces comprising rotary hearth furnaces, rotary kiln furnaces, shaft furnaces, cyclone furnaces, or batch-type furnaces. The invention is therefore also embodied in a method wherein the reduction reaction of the metal-oxygen compound is performed in a fluidised bed, a rotary hearth furnace, a rotary kiln furnace, a cyclone furnace, or a batch-type furnace, to produce directly reduced metal. The invention is further also embodied in a method wherein the metal-oxygen compound is an iron-oxygen-compound and in that the reduction process of the iron-oxygen compound is performed in a fluidised bed, a rotary hearth furnace, a rotary kiln furnace, a cyclone furnace, or a batch-type furnace.

The invention is also embodied in a method for reducing metal-oxygen compound to produce a substantially solid material comprising a metallic part and a non-metallic part wherein the substantially solid material is treated to separate the metallic part from a non-metallic part such as gangue or slag. This separation step may be performed for instance in a cyclone.

The invention is also embodied in a method wherein the metallic part is compressed to reduce its porosity. The metallic part may also be rolled to form a slab, billet, bloom, rod, section or strip. This method enables omitting a step in the production process starting from ore and ending with slab, thereby significantly reducing costs and energy consumption. The metallic part may also be extruded to form a profile, section or rod, or be formed into a near net shape product. These products will require no, or only limited final processing.

The metallic part may also be used as feed material in a smelting operation, for instance using an Electric Arc Furnace or, in case of iron, as feed material in a steelmaking process at least as a partial replacement of scrap in for instance a Basic Oxygen Steelmaking process or a Siemens Martin Steelmaking process.

It should be noted that preferably the metal in the metal-oxygen compound(s) is iron, copper, cobalt, nickel, ruthenium, rhodium, palladium, platinum or iridium. It should be noted that for some metals more than one metal-oxygen compound exists, e.g. copper-oxide and copper-hydroxide. The invention also relates to a method wherein the metal-oxygen compound comprises a mixture of at least two metal-oxygen compounds, wherein the metals in the metal-oxygen compounds are different and wherein each of the metals comprises iron, copper, cobalt, nickel, ruthenium, rhodium, palladium, platinum or iridium, thereby producing a reduced product comprising at least two different metals. The advantage of this embodiment is that an alloy may be produced directly. The first promoter metal or first promoter metals may also be different from the metal or metals in the metal-oxygen compound.

A gaseous mixture comprising the carbon monoxide, from which the carbon is to be formed by the Boudouard reaction, may be produced by treating in a standard gasifier according to a known process at least one carbon-containing compound which is chosen from a group of carbon-containing compounds comprising cokes, coal, charcoal, oil, plastics, natural gas, paper, biomass, tar sands, strongly polluted carbon-containing energy sources. Undesired elements like for instance sulphur may be removed from the gaseous mixture by an appropriate pre-treatment and/or post-treatment. The standard gasifier may be equipped with means to control the output of hazardous or unwanted by-products, which result from the gasification of the carbon-containing compound.

The invention also relates to an apparatus for carrying out the reduction of a metal-oxygen compound wherein carbon acts as a reducing agent, comprising:

a first stage reaction chamber adapted to hold a solid charge of the metal-oxygen compound, an inlet to the first reaction chamber for entry of the metal-oxygen compound, a second stage reaction chamber, transport means for transferring the solid charge, following reaction in the first stage reaction chamber, from the first stage reaction chamber into the second stage reaction chamber, means for passage of CO gas from the second stage reaction chamber to the first stage reaction chamber, and a discharge outlet for discharge of substantially solid reaction products from the second stage reaction chamber.

Thus for example a reactor is used comprising a first reaction region and a second reaction region. In the first reaction region, nearer to the inlet for the metal-oxygen compounds, carbon is formed from the carbon monoxide by the Boudouard reaction as a result of the choice of operating parameters such as temperature and pressure, and in the second reaction region, nearer to an outlet for the substantially solid material resulting from the reduction of the metal-oxygen compounds, the metal-oxygen compounds are reduced as a result of the choice of operating parameters such as temperature and pressure. Preferably, at similar operating pressures, the temperature of the first reaction region is lower than the temperature of the second reaction region.

It should be noted that preferably the first and/or second promoter material is added at the start of the process. It is obvious from the above that the first and/or second metal optionally can also be added in a later or earlier stage of the process, thereby requiring an optional additional inlet. Also, during start-up of the process, but also during the process, compounds similar to Boudouard-carbon and in a suitable form, such as graphite powder, may be added to the metal-oxygen compounds to serve as the reducing agent in the reduction reaction of the metal-oxygen compounds, thereby optionally requiring one or more additional inlets for the carbon.

Preferably the apparatus includes means for generating hot CO gas to be fed into the second stage reaction chamber.

In a further embodiment according to the invention, the apparatus also comprises means to reintroduce at least part of gaseous reaction products into the process. Moreover, the apparatus may also comprise means to reintroduce at least part of substantially solid material resulting from the reduction of the metal-oxygen compounds into the process.

In a further embodiment the reaction regions may be physically separated to occur in separate reactors, enabling a more independent choice of operating parameters such as temperature and pressure.

In a further embodiment the apparatus includes a fluidised bed providing at least one of the first and second stage reaction chambers. In still a further embodiment the apparatus comprises a furnace chosen from the group of furnaces comprising rotary hearth furnaces, rotary kiln furnaces, shaft furnaces, cyclone furnaces, continuous or batch-type furnaces.

In a preferred embodiment, the apparatus has a substantially tubular, more preferably a substantially axi-symmetrical shape.

BRIEF INTRODUCTION OF THE DRAWINGS

A specific embodiment of the present invention will now be explained by the following non-limitative examples and described with reference to the schematic drawing of which:

DESCRIPTION OF THE PREFERRED EMBODIMENTS

Figure 1:
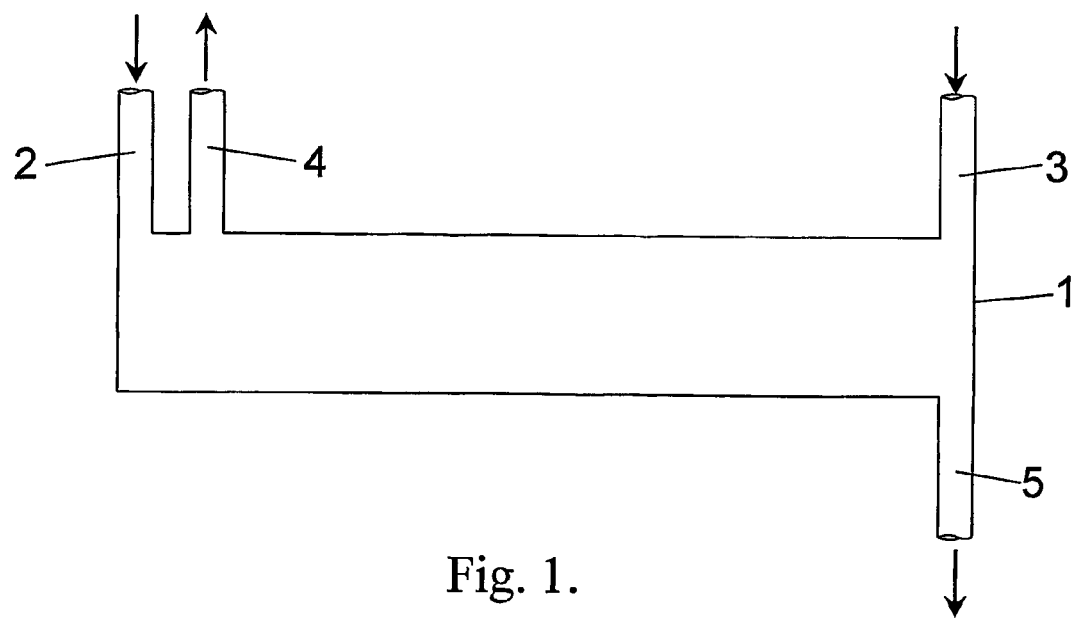
FIG. 1 shows schematically an apparatus embodying the invention.

In FIG. 1 the invention is embodied in an apparatus for reducing metal-oxygen compounds according wherein the apparatus comprises a reactor 1, an inlet 2 for the metal-oxygen compounds, an inlet for the first and/or second promoter material, here in the form of first and/or second metal (not shown, unless the first and/or second metal is added together with the metal-oxygen compounds, in which case the first and/or second metal inlet is 2 as well), an inlet 3 for a gaseous mixture comprising carbon-monoxide, heating means to heat the different parts of the reactor (not shown), an outlet 4 for the gaseous reaction products and an outlet 5 for the substantially solid material resulting from the reduction of the metal-oxygen compounds.

Figure 2:
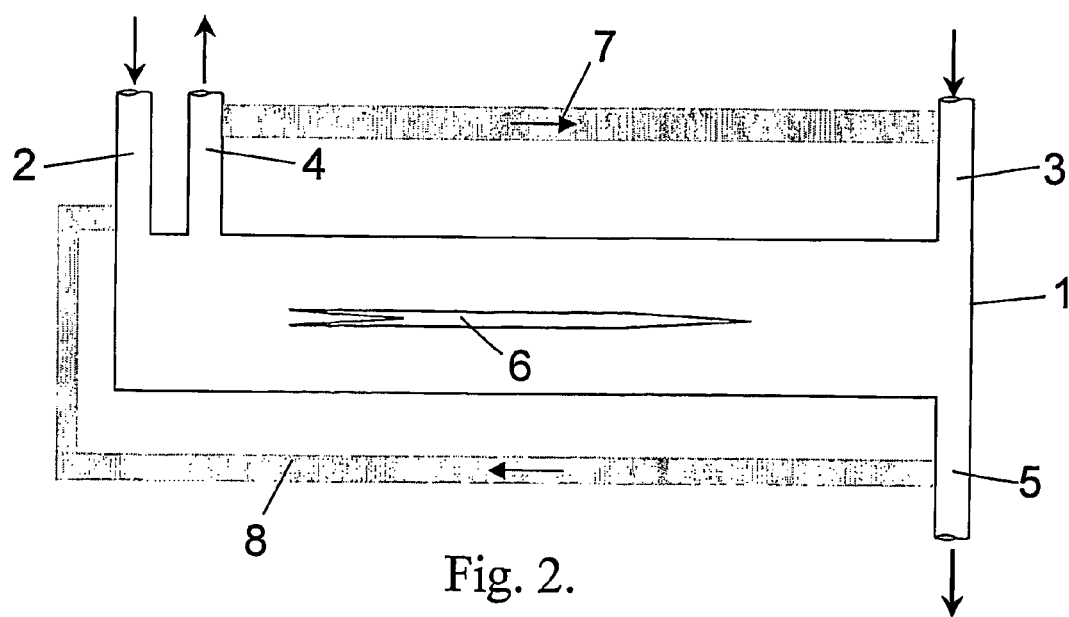
FIG. 2 shows schematically another embodiment of an apparatus embodying the invention.

In FIG. 2 another embodiment of the invention is shown wherein the apparatus comprises a reactor 1, an inlet 2 for the metal-oxygen compounds, an inlet for the first and/or second promoter materials, here in the form of first and/or second metal (not shown, unless the first and/or second metal is added together with the metal-oxygen compounds, in which case the first and/or second metal inlet is 2 as well), an inlet 3 for a gaseous mixture comprising carbon-monoxide, heating or cooling means to heat or cool the different parts of the reactor (not shown), an outlet 4 for the gaseous reaction products and an outlet 5 for the substantially solid material resulting from the reduction of the metal-oxygen compounds, transportation means 6 to transport the solid reactants, means 7 to reintroduce at least part of gaseous reaction products from outlet 4 into the process, and means 8 to reintroduce at least part of substantially solid material resulting from the reduction of the metal-oxygen compounds.

Figure 3:
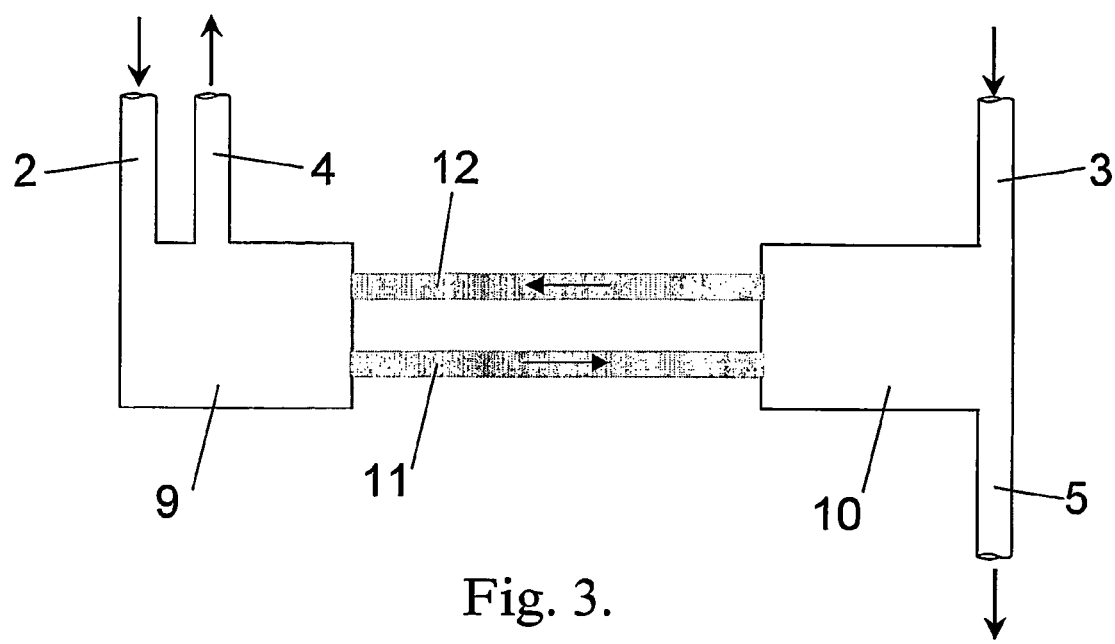
FIG. 3 shows schematically a further embodiment of an apparatus embodying the invention with separated reaction regions.

In FIG. 3 another embodiment of the invention is shown wherein the reactor comprises a first reactor part 9 where the generation of carbon by the Boudouard reaction mainly occurs, a second reactor part 10 where the reduction of the metal-oxygen compounds mainly occurs, transport means 11 to transport the solid reactants from the first reactor part 9 to the second reactor part 10, transport means 11 to transport the gaseous mixture comprising carbon-monoxide from the second reactor part 10 to the first reactor part 9, an inlet 2 for the metal-oxygen compounds, an inlet for the first and/or second promoter materials, here in the form of first and/or second metal (not shown, unless the first and/or second metal is added together with the metal-oxygen compounds, in which case the first and/or second metal inlet is 2 as well), an inlet 3 for a gaseous mixture comprising carbon-monoxide, heating or cooling means to heat or cool the different parts of the reactor (not shown), an outlet 4 for the gaseous reaction products and an outlet 5 for the substantially solid material resulting from the reduction of the metal-oxygen compounds. This embodiment may also be equipped with means to reintroduce at least part of the gaseous reaction products from outlet 4 into the process, and means to reintroduce at least part of the substantially solid material resulting from the reduction of the metal-oxygen compounds as a first and/or second metal into the process through the catalyst inlet, but these are not shown in FIG. 3.

One or more optional inlets may be present in all three embodiments for the introduction of compounds similar to Boudouard-carbon and in a suitable form, such as graphite powder during start-up of the process and/or during the process.

Examples will now be given to explain and exemplify the invention. Examples 1 and 2 illustrate the effect obtained in the second reaction stage of the invention only.

EXAMPLE 1

In a thermal gravimetry analyser a homogeneous mixture of iron oxide as the metal-oxygen compound, carbon as the reducing agent for reducing the metal-oxygen compound and iron as the first and second metal, was heated. The amount of carbon was chosen to be sufficient to enable a complete reduction of the iron oxide to metallic iron. The reduction in mass of the mixture forms a direct indication of the reduction of the metal-oxygen compound. In case of a complete reduction, a reduction of mass of about 12-15% is to be expected. These measurements showed that at temperatures between 650 and 850° C. a complete reduction of the iron oxide was achieved when powder of crystalline carbon such as crystalline graphite, synthetic graphite, elektrographite or Boudouard-carbon was used. Powder coal, activated carbon or powder coke proved to be less effective insofar that the iron oxide was not or only partly reduced to iron below 900° C. The activity of amorphous carbon for the reduction of the iron oxide proved to be lower than the activity of crystalline carbon such as graphite, but higher than the activity of powder coal, activated carbon or powder coke.

EXAMPLE 2

In a reactor, comprising a stainless steel tube and a furnace, an extruder type screw was mounted as transportation means for solid reactants. A mixture of iron oxide, carbon similar to Boudouard-carbon and in a suitable form, and iron powder as a first metal, was introduced in the tube and brought to a temperature of between 650° C. and 850° C. The iron oxide reduced to metallic iron quickly.

EXAMPLE 3

Example of the Invention

In a reactor according to FIG. 2, wherein a stainless steel tube forms the reactor, an extruder type screw was mounted as transportation means 6 for the solid reactants. The arrow indicates the transportation direction of the solid reactants. A mixture of iron oxide as the metal-oxygen compound and iron powder as a first metal was introduced through inlet 2 at one end of the tube and transported to the other end of the tube by the extruder screw 6. In counter flow, a hot gaseous mixture comprising carbon monoxide was introduced into the reactor through inlet 3, also providing the heat for the reduction reactions in the reactor. The temperature of the reactants at the entry of the gaseous mixture was about 900° C. and the temperature at the exit of the gaseous mixture of the solid reactants was about 550° C. At the cool end of the reactor, in the first reaction region, Boudouard-carbon was formed from the carbon monoxide by the Boudouard reaction with the aid of the metallic iron which performs the role associated with a catalyst. The resulting carbon dioxide leaves the process through outlet 4 as a part of the gaseous reaction products. The Boudouard-carbon precipitated on the solid reactants and was transported by the extruder screw to the second reaction region together with the solid reactants. In said second reaction region the iron oxide is reduced by the Boudouard carbon resulting in metallic iron and a mixture of carbon monoxide and carbon dioxide. Part of the substantially solid iron may be reintroduced into the process by means 8 as a first metal through for example inlet 2 and part of the gaseous reaction products may be reintroduced by means 7 through for example inlet 3.

It is of course to be understood that the present invention is not limited to the embodiments and examples described above, but encompasses any and all embodiments within the scope of the claims and the description and within the spirit of the invention as herein disclosed.

The invention claimed is:

1. A method of reducing a solid metal-oxygen compound wherein solid carbon acts as a reducing agent, comprising:
   in a first reaction stage, passing CO gas into a reaction chamber containing said metal-oxygen compound, under conditions such that CO is converted to solid carbon and carbon dioxide thereby introducing the solid carbon so formed to said solid metal-oxygen compound, wherein said first reaction stage is performed at a temperature of at most 650° C., and discharging the solid carbon and solid metal oxygen compound from the first stage, and
   in a second reaction stage, causing said carbon, which is introduced to the metal-oxygen compound in said first reaction stage, to reduce said metal-oxygen compound, wherein said second reaction stage is performed at a temperature of at most 900° C., and discharging solid reduced metal-oxygen compound, wherein the method is performed continuously, said first and second reaction stages being performed simultaneously and said metal-oxygen compound being moved from a first reaction region where said first reaction stage takes place to a second reaction region where said second reaction stage takes place, wherein said second reaction stage is performed at a higher temperature than said first reaction stage, wherein there is present, at least in said second reaction stage, a first promoter material effective to promote the reduction of said metal-oxygen compound, the first promoter material comprising a first promoter metal and/or a compound of a first promoter metal.

2. A method according to claim 1, wherein the solid carbon comprises carbon formed by dissociation of carbon monoxide by the Boudouard reaction.

3. A method according to claim 2, wherein CO gas formed in the second reaction stage is used in said first reaction stage.

4. A method according to claim 1, wherein said first promoter material is said first promoter metal, or a first promoter metal carbide, a first promoter metal hydride or a first promoter metal nitride, or a combination thereof.

5. A method according to claim 1, wherein said first promoter material is in powder form.

6. A method according to claim 1, wherein said first promoter metal is the same as the metal of said metal-oxygen compound.

7. A method according to claim 1, wherein, at least in said first reaction stage, a second promoter material is present, the second promoter material comprising a second promoter metal and/or a compound of a second promoter metal which promotes the conversion of CO to carbon and carbon dioxide.

8. A method according to claim 7, wherein said second promoter material is said second promoter metal, or a second promoter metal carbide, a second promoter metal hydride or a second promoter metal nitride, or a combination thereof.

9. A method according to claim 8, wherein said second promoter material is in powder form.

10. A method according to claim 1, wherein said metal-oxygen compound is in the form of a conglomerate formed from powder.

11. A method according to claim 1, wherein said metal-oxygen compound and said first promoter material are in the form of conglomerate formed from their powders.

12. A method according to claim 1, wherein the metal of said metal-oxygen compound is Fe, Cu, Co, Ni, Ru, Rh, Pd, Pt or Ir.

13. A method according to claim 1, wherein said first reaction stage is performed below 650° C.

14. A method according to claim 1, wherein the metal-oxygen compound comprises iron-oxygen compound, such as iron oxide and/or iron hydroxide and/or iron carbonate.

15. A method according to claim 1, wherein said first promoter metal, and second promoter metal if present, is iron.

16. A method according to claim 1, wherein said second reaction stage is performed between 550 and 900° C.

17. A method according to claim 1, wherein said metal-oxygen compound comprises a mixture of at least two metal-oxygen compounds, wherein the metals in the metal-oxygen compounds are different and wherein each of the metals comprises Fe, Cu, Co, Ni, Ru, Rh, Pd, Pt or Ir.

18. A method according to claim 1, carried out in a shaft furnace, a blast furnace, a fluidised bed, a rotary hearth furnace, a rotary kiln furnace, a cyclone furnace or a batch-type furnace.

19. A method according to claim 1, wherein a substantially solid reaction product is produced in the second reaction stage and wherein a portion of said reaction product from said second reaction stage is introduced into said first reaction stage.

20. A method according to claim 1, wherein gaseous reaction product is extracted and reintroduced into the process.

21. A method according to claim 7, wherein said metal-oxygen compound and said first promoter material, and said second promoter material, are in the form of conglomerate formed from their powders.

* * * * *

UNITED STATES PATENT AND TRADEMARK OFFICE
CERTIFICATE OF CORRECTION

PATENT NO. : 7,591,874 B2  Page 1 of 1
APPLICATION NO. : 10/574466
DATED : September 22, 2009
INVENTOR(S) : Christiaan Johannes Kooij It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this

Twenty-first Day of September, 2010

David J. Kappos
*Director of the United States Patent and Trademark Office*